United States Patent [19]

Iwata

[11] 3,743,849
[45] July 3, 1973

[54] APPARATUS FOR AUTOMATICALLY DISCONNECTING POWER CIRCUIT FOR VEHICLES DUE TO IMPACT

[75] Inventor: Akio Iwata, Kiryu, Japan

[73] Assignee: Mitsubadenkiseisakusho Co., Ltd., Kiryu, Gunma-Prefecture, Japan

[22] Filed: May 18, 1971

[21] Appl. No.: 144,473

[30] Foreign Application Priority Data
Sept. 21, 1970 Japan....... 45/92898
Sept. 21, 1970 Japan....... 45/81964

[52] U.S. Cl.............. 307/10 R, 180/96, 200/61.45, 340/61
[51] Int. Cl............................................. H02g 3/00
[58] Field of Search .................. 180/96, 97, 99, 98, 180/100, 102, 101, 103, 104, 105, 82; 200/80, 61.45; 340/261, 262, 53, 61; 307/121, 10 R

[56] References Cited
UNITED STATES PATENTS
3,154,168 10/1964 Wilmont............................. 180/103
3,493,701 2/1970 Clarke........................... 200/61.45 R Primary Examiner—Herman J. Hohauser
Attorney—Fidelman, Wolffe & Leitner

[57] ABSTRACT

In cases where any trouble occurs due to the collision, rear-end collision or the like of vehicles, particularly of automobiles, this apparatus is used to automatically disconnect the power circuit instantaneously by the impact force caused upon the trouble, further to automatically cut off the fuel circuit by means of a solenoid valve and the like to prevent fire from breaking out after the collision.

6 Claims, 11 Drawing Figures 3,743,849

APPARATUS FOR AUTOMATICALLY DISCONNECTING POWER CIRCUIT FOR VEHICLES DUE TO IMPACT

SUMMARY OF THE INVENTION

This invention relates to an appparatus for automatically disconnecting a power circuit due to impact. In cases where any trouble occurs due to the collision, rear-end collision or the like of vehicles, particularly of automobiles, fires accompanying explosions of fuels such as gasoline, liquid gas and the like often break out to develop further the trouble, and expose vehicles and the like in the vicinity of the troubled vehicle to the danger of fire. The present invention provides an apparatus capable of disconnecting automatically the power circuits and automatically breaking the fuel circuit by use of a solenoid valve and the like upon the vehicle trouble accompanying such large impacts, and is intended to contribute the prevention of vehicle fires caused by the collosion, rear-end collision and the like.

Accordingly, the first object of the present invention is to provide a power circuit for use in vehicles which can be automatically disconnected by the impact force, when a trouble such as a collision, a rear-end collision or the like of vehicles occurs, thereby to prevent the occurrence of fire.

Further, the second object of the present invention is to provide an impact switch which is provided at said power circuit for vehicles and can be used to automatically break the circuit by utilizing the impact force upon its collision or rear-end collosion.

Still further, the third object of the present invention is to provide an improved structure relative to said impact switch, which can be adapted to the case of a low impact and easily adjusted so as to obtain constantly precise operation and also well adapted to the production management.

Still further, the fourth object of the present invention is to provide a structure of a leaf spring well adapted to the construction of said improved impact switch.

Other objects and advantages of the present invention will be made clear from the explanation on a few preferred embodiments of the present invention described with reference to the accompanying drawings.

DETAILED DESCRIPTION OF THE INVENTION

Figure 1:
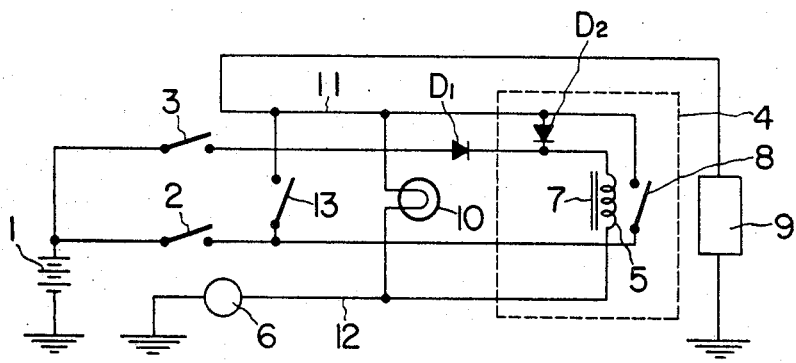
FIG. 1 is a diagram showing a security circuit for preventing fire of vehicles showing one embodiment of the present invention.

In FIG. 1 showing the security circuit for preventing fire of vehicles which is one preferred embodiment of the present invention, reference numeral 1 designates a power source, and 2, an ignition switch. Reference numeral 3 designates a starter switch which is connected to a magnetic induction coil 5 within a relay portion 4, said magnetic induction coil 5 being grounded at its one terminal and connected to an impact switch 6 which is closed at ordinary state. When both the ignition switch 2 and the starter switch 3 are closed, a circuit connecting the starter switch 3, the magnetic induction coil 5 and the impact switch 6 is connected, the field of the magnetic induction coil 5 is reinforced by an iron core 7, and as the result, a movable iron piece 8 located within the relay portion 4 is attracted. By a fact that said movable iron piece 8 is attracted, a circuit of a load 9 for various circuits of wirings of the ignition switch 2, the movable iron piece 8 and the entire part of vehicle is formed. Reference characters $D_1$ and $D_2$ denote diodes for preventing the counterflow which allow a current to flow in one direction. Therefore, when the ignition switch 2 and the starter switch 3 are closed, said circuit is formed and a circuit for the ignition switch 2, the magnetic induction coil 5 and the impact switch 6 is formed through the diode $D_2$, and even if the starter switch 3 is disconnected, the magnetic induction coil 5 and the load 9 are retained in a current flowing state. Reference numeral 10 designates a pilot lamp which is connected to the midway of a circuit 11 connecting the movable iron piece 8 and the load 9 and a circuit 12 connecting the magnetic induction coil 5 and the impact switch 6, and is lighted only in the case where the circuits are all connected normally.

When a large impact is applied to a vehicle at the state where the normal circuits are formed as mentioned above, the impact switch 6 is disconnected instantaneously and automatically, the current flow to the magnetic induction coil 5 is stopped. As the result, the movable iron piece 8 is opened and the circuit to the load 9 is broken, the current does not flow to the magnetic induction coil 5 even when the impact switch 6 is closed again automatically, and therefore the circuit leading to the load 9 is remained in broken state and is not connected thereto until the starter switch 3 is closed again. Also, there is provided a short switch 13 which short-circuits the ignition switch 2 with the circuit 11 in place of closing again the starter switch 3 in a case where the impact switch 6 operates erroneously, and forms a circuit excluding the automatic impact switch 6 on case of the current flowing to the load 9. Accordingly the short switch 13 can be closed in case where it is unfavorable or unnecessary to operate the impact switch 6.

Next, explanation will be made on the impact switch which is the first embodiment illustrated in FIGS. 2 and 3. Reference numeral 14 designates a movable spherical contactor (steel ball) excellent in magnetizability and conductivity and is placed on a ring-shaped stationary contactor 15 whose central portion is cut out so as to form the inner peripheral face $a$ secured tight to the spherical face of said steel ball 14 in a ring shape. The stationary contactor 15 is made from a material excellent in magnetizability as well as conductivity in the same manner as the case of the steel ball 14, and in both cases a heat treatment restricting the residual magnetism to the minimum is necessary. Reference numeral 16 designates a ring-shaped ferrite magnet to the upper face of which said stationary contactor 15 is bonded, said ferrite magnet 16 being placed on a ferrous switch fitting plate 18 through a magnet end plate 17. The central protuberant portion b of said end plate 17 is fitted in the inner face of the cylinder of the ferrite magnet 16 to position the ferrite magnet 16, and further a pole 19 is screwed in the central portion of said protuberant portion in a height freely adjustable manner. A hole c in which a spring 20 is inserted to push up the steel ball from the lower part is formed at the upper end of said pole 19, and the adjustment of the pressing force of the spring 20 is carried out by the adjustment of the height of the pole 19 and set by a lock nut 21. Reference numeral 22 designates a lead-out line to contact the stationary contactor 15, and 23, a cover which is fitted in the outer peripheries of the stationary contactor 15, the ferrite magnet 16 and the magnet end plate 17, and covers over the stationary contactor 15 and the steel ball 14.

Figure 2:
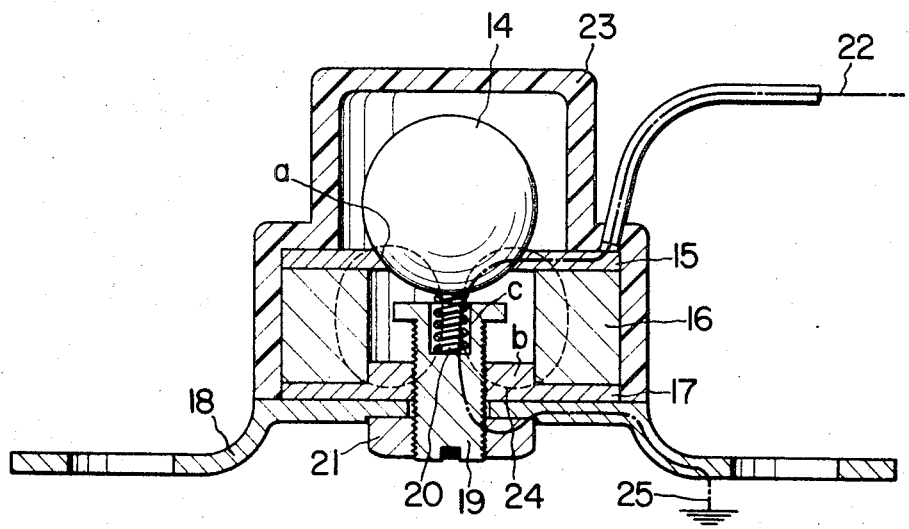
FIG. 2 is a front elevation, partly in vertical section, showing an impact switch showing a first embodiment of the present invention.
Figure 3:
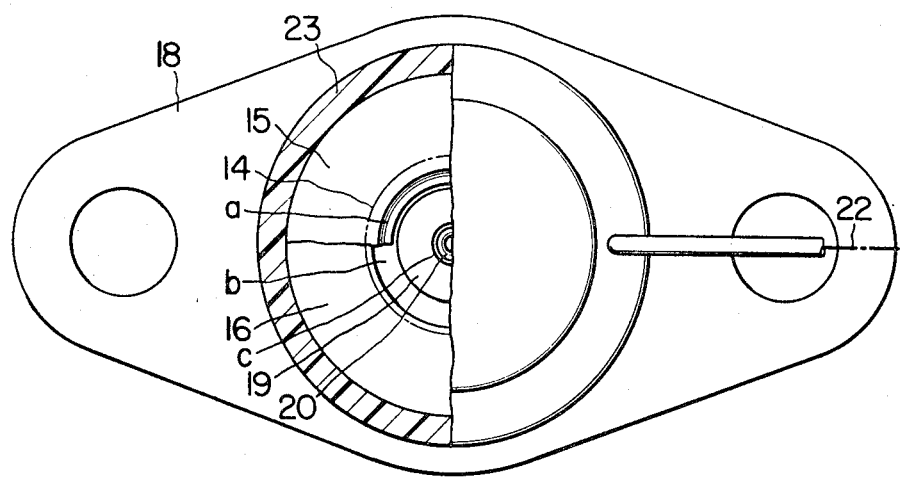
FIG. 3 is a plan view, partly in section, showing the impact switch shown in FIG. 2.

In the first embodiment of the impact switch shown in FIGS. 2 and 3, the steel ball 14, while receiving pressure from the spring 20, comes into contact with the inner peripheral face a of the stationary contactor 15 and is attracted by a magnetic field 24 formed by the ferrite magnet 16 at the ordinary state. At that time, a circuit 25 is formed between the lead-out line 22 and the switch fitting plate 18 through the stationary contactor 15, the steel ball 14, the spring 20, the pole 19 and the lock nut 21, which are all connected to each other. However, when the impact switch 6 receives an impact force overcoming the attractive force of the magnet 16, the steel ball 14 comes off from the cut-out portion of the stationary contactor by the inertia inherent in the steel ball 14 and separates instantaneously from the spring 20 (or the spring is adjusted so that it is separated) and the circuit 25 connecting the lead-out line 22 to the switch fitting plate 18 is broken. By the aforementioned action the security circuit for preventing vehicle fires and the like shown in FIG. 1 operates satisfactorily.

Upon the vehicle trouble accompanying the large impact, the apparatus for automatically disconnecting the power circuit for vehicles due to the impact provided with the impact switch which is the first embodiment of the present invention and is constituted as described in the foregoing, can automatically disconnect the power circuit and it becomes possible according to the present invention further to automatically break the fuel circuit by use of a solenoid valve and the like, and sufficient effects are displayed to prevent vehicle troubles such as collision, rear-end collision and the like.

However, since the impact switch shown in the first embodiment involves the following problematic points, there are difficulties in practical use:

1. The spring 20 has elasticity and is elongated by following the movement of the steel ball 14 and is difficult to separate therefrom. It is, therefore, difficult to be applicable for the case of the low impact.

2. In the vicinity where the steel ball 14 is separated from the spring 20, that is, in the vicinity where the spring 20 becomes close to the free length and the expansive force vanishes, the contact between the steel ball 14 and the spring 20 becomes unstable.

3. Since the adjustment of the spring 20 and that of the impact value must be made in one direction, it requires skill in adjustments and deteriorates productivity, and therefore the management becomes difficult.

Figure 4:
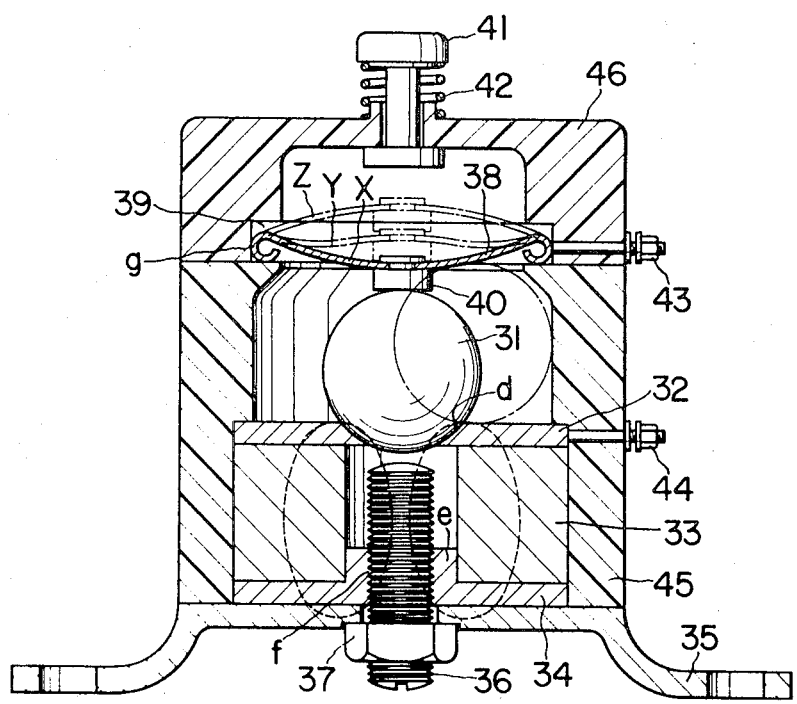
FIG. 4 is a front elevation, partly in vertical section, showing an impact switch showing a second embodiment of the present invention.
Figure 5:
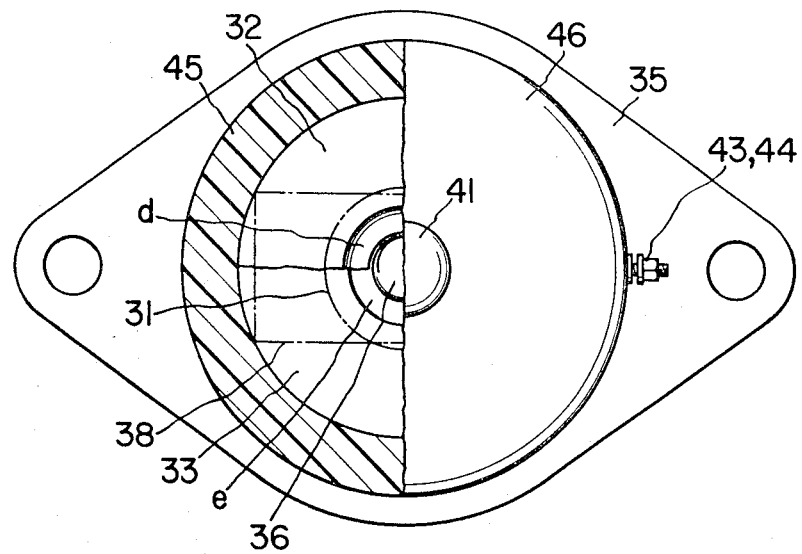
FIG. 5 is a plan view, partly in section, showing the impact switch shown in FIG. 4.

The impact switch of the second embodiment shown in FIGS. 4 and 5 solves these difficult points. In the drawings, reference numeral 31 designates a spherical movable contactor (steel ball) which is excellent in magnetizability and becomes a conductor by being plated with silver or the like. Said steel ball 31 is placed on a stationary contactor 32 cut out at its central portion so as to form the inner peripheral face d secured tight to the spherical face of said steel ball 31 is a ring-shape. The aforementioned stationary contactor 32 is made from a material excellent in magnetizability and conductivity in the same manner as the case of the steel ball 31 and is plated with silver and the like, and both are required to be subjected to such a heat treatment or the like as restricting the residual magnetism to the minimum. Reference numeral 33 designates a ferrite magnet to bond said stationary contactor 32 to its upper face, said ferrite magnet 33 is placed on a ferrous switch fitting base 35 through a magnet end plate 34. The central protuberant portion e of said end plate 34 is fitted in the inner face of the ferrite magnet 33 to position said ferrite magnet 33, and a pole 36 is provided on the protuberant portion e through a screw f in a height freely adjustable manner. Accordingly, the clearance between said pole 36 and the steel ball 31 is adjusted by the screwing amount of the pole 36, and is set by a lock nut 37.

Reference numeral 38 designates a leaf spring constituted by a thin elastic plate, both ends of said spring being curled g, formed in a flat or an arch shape symmetrically with respect to the centerline, and fitted in an installating hole 39 in a length shorter than the length in a free state. Further, the curled portion g of the leaf spring 38 is made slightly smaller than the installating hole 39 such that it can slide smoothly with respect to the installating hole 39, and the central portion of the leaf spring 38 has a contact 40 which contacts the steel ball 31. Further, when the leaf spring 38 is pushed upwardly by the steel ball 31, it is reversed at a certain position instantaneously. Reference character X in FIG. 4 indicates a state of the leaf spring 38 at the initial set time, Y, a state where the leaf spring 38 is pushed up to a certain degree, and Z, a state where the leaf spring 38 is reversed. Reference numeral 41 designates a reset button used when the leaf spring 38 is restored to the state of X at the set time in the case where it has been reversed as shown by Z in FIG. 4. The reset button is pushed up by means of a spring 42 at the ordinary time.

Reference numeral 43 designates a terminal connected to the leaf spring 38, 44, a terminal connected to the stationary contactor 32, and 45 and 46, covers which are made from an insulating substance such as a synthetic resin or the like, and cover over the steel ball 31, the stationary contactor 32, the ferrite magnet 33, magnet end plate 34, the leaf spring 38 and the like, and are provided with the reset button 41 and the trminals 43 and 44.

The action of the impact switch in the second embodiment constituted as mentioned above will be explained hereinbelow. As shown in FIG. 4, at ordinary state the steel ball 31, while receiving the pressure of the leaf spring 38 (shown by X in FIG. 4) through the contact 40, comes into contact with and is absorbed to the inner peripheral face d of the stationary contactor 32 by the magnetic field (shown by broken line) formed by the ferrite magnet 33. Accordingly, at that time, an electric circuit for the terminal 43, the leaf spring 38, the contact 40, the steel ball 31, the stationary contactor 32 and the terminal 44 is formed between the terminal 43 and 44. However, when an impact more than a predetermined value is applied, the steel ball 31 migrates on the surface of the stationary contactor 32 in the direction of impact thereby to push up the contact 40 in abutment with said steel ball 31. When said contact 40 reaches a certain height, the leaf spring 38 is reversed instantaneously and reaches the state of Z through the state of Y in FIG. 4. Accordingly, the contact 40 separates from the steel ball 31, disconnects said circuit and opens the circuit between the terminals 43 and 44. In the case of resetting the circuit, the leaf spring 38 is pushed down from the upper part by means of the reset button 41 to restore the steel ball 31 and the leaf spring 38 to the state of X.

Figure 6A:
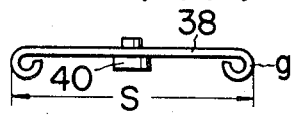
FIGS. 6(A) and (B) are front elevations respectively showing two examples of a leaf spring used in the impact switch shown in FIGS. 4 and 5.
Figure 6B:
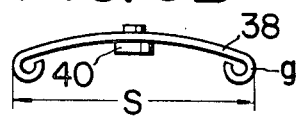
Figure 7A:
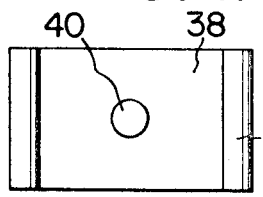
FIGS. 7(A), (B) and (C) are bottom plan views respectively showing three examples of the leaf spring shown in FIG. 6.
Figure 7B:
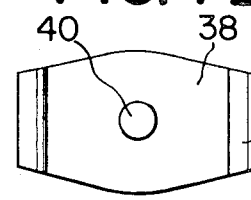
Figure 7C:
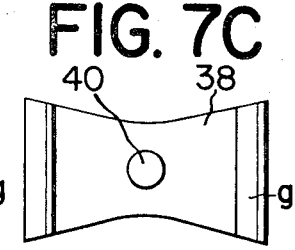
Figure 8:
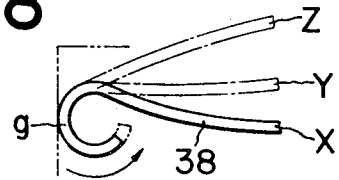
FIG. 8 is an enlarged front elevation, partly in section, showing the order of the reversible action of the leaf spring shown in FIG. 6.

Next, the leaf spring used in the impact switch shown in FIGS. 4 and 5 will be explained hereinbelow. FIGS. 6 (A) and (B) are front elevations showing two examples of the leaf spring. FIGS. 7 (A), (B) and (C) are bottom plan views showing three examples of the leaf spring. In the drawings, reference numeral 38 designates a leaf spring which is constituted by a thin elastic plate and may have various shapes of rectangular, center-thick or center-thin type respectively shown in FIGS. 7 (A), (B) and (C), both ends of said spring being curled g in one direction and a contact 40 being secured to the center thereof. The leaf spring 38 is shaped flat in the free state or symmetric with respect to the centerline, as shown in FIGS. 6 (A) and (B), and is pushed and fitted in said installating hole 39 in a length shorter than the free length S. The curled portion g of said leaf spring 38 is made slightly smaller than the installating hole 39 so that it can smoothly slide with respect to the installating hole 39. When said leaf spring 38 is pushed upwardly by the steel ball 31 as mentioned above, it is reversed instantaneously into the state of Z from the state of X through that of Y. Accordingly, the contact 40 is separated from the steel ball 31 and the circuit between the terminals 43 and 44 is disconnected. Upon this occasion, since both ends of the leaf spring 38 are curled g in one direction, the spring is made as shown in FIG. 8 on an enlarged scale. That is, when the central portion of said leaf spring is pushed up, the curled portion g is moved to be wound in the direction of arrow, and reversed at a time point where it is wound to a certain degree. The existence of the curled portion g is important to carry out the reversion smoothly, but if it is not existing, the leaf spring 38 produces modifications such as irregular waveforms and therefore the smooth reversion can not be carried out. Also, the existence of the curled portion g reduces the friction as well as the reversible force, and therefore the precise switching can be effected.

I claim:

1. An apparatus for automatically disconnecting a power circuit of vehicles due to impact comprising:
a first circuit having connected in series a power source, a starter swtich, a first diode, a magnetic induction coil of a relay and an impact switch; a second circuit having connected in series said power source, an ignition switch, a movable iron piece opened and closed by the magnetic force of said magnetic induction coil and a load;
and a second diode having one lead connected between said first diode and said magnetic induction coil of said first circuit and having its other lead connected between said movable iron piece and said load of said second circuit;
said first and second diodes being connected so that current through will not flow through the other.

2. The apparatus for automatically disconnecting a power circuit of vehicles due to impact as defined in claim 1, wherein the first circuit and the second circuit are connected to each other through a pilot lamp.

3. The apparatus for automatically disconnecting a power circuit of vehicles due to impact as defined in claim 1, including a short switch having one lead connected between said ignition switch and said movable iron piece of said second circuit piece and having its other lead connected between said second diode and said load of said second circuit.

4. The apparatus for automatically disconnecting a power circuit of vehicles due to impact as defined in claim 1, wherein said impact switch comprises a stationary contactor whose cneter is cut out resting on a ring-shaped ferrite magnet, a spherical movable contactor is placed on said stationary contactor, a spring is interposed in a hole at the forward end of a pole screwed and secured in the hollow portion of said ferrite magnet through a magnet end plate in a freely advancing and retreating manner, a forward end of said spring is constantly in contact with said spherical movable contactor and when an impact is applied, both are separated from each other instantaneously.

5. The apparatus for automatically disconnecting a power circuit of vehicles due to impact as defined in claim 1, wherein said impact switch comprises a stationary contactor whose center is cut out resting on a ringshaped ferrite magnet, a spherical movable contactor is placed on said stationary contactor, a pole being screwed and secured in the hollow portion of said ferrite magnet through a magnet end plate in a freely advancing and retreating manner, a forward end of said pole is in a predetermined spaced relationship to the spherical movable contactor, and a leaf spring which is reversible and ordinarily presses downward said spherical movable contactor through a contact at the center of said leaf spring but is reversed in accordance with the migration of the movable contactor when an impact more than a predetermined value is applied thereby to disconnect the contact from the spherical movable contactor.

6. The apparatus for automatically disconnectng a power circuit of vehicles due to impact as defined in claim 1, wherein said impact switch comprises a stationary contactor whose center is cut out resting on a ring-shaped ferrite magnet, a spherical movable contactor is placed on said stationary contactor, a pole being screwed and secured in the hollow portion of the ferrite magnet through a magnet end plate in a freely advancing and retreating manner, a forward end of said pole is in a predetermined spaced relationship to said spherical movable contactor, a leaf spring which is reversible and ordinarily presses downward said spherical movable contactor through a contact at the center of said leaf spring but is reversed in accordance with the migration of the movable contactor, said leaf spring having both ends curled in one direction and in a flat or arch shape in a free state, and said leaf spring being pressed and supported in an installating hole having a length slightly shorter than the free length between the curled portions.

* * * * *